(No Model.)
W. F. HUTCHINSON.
SHAFT CASING.
No. 276,589. Patented May 1, 1883.
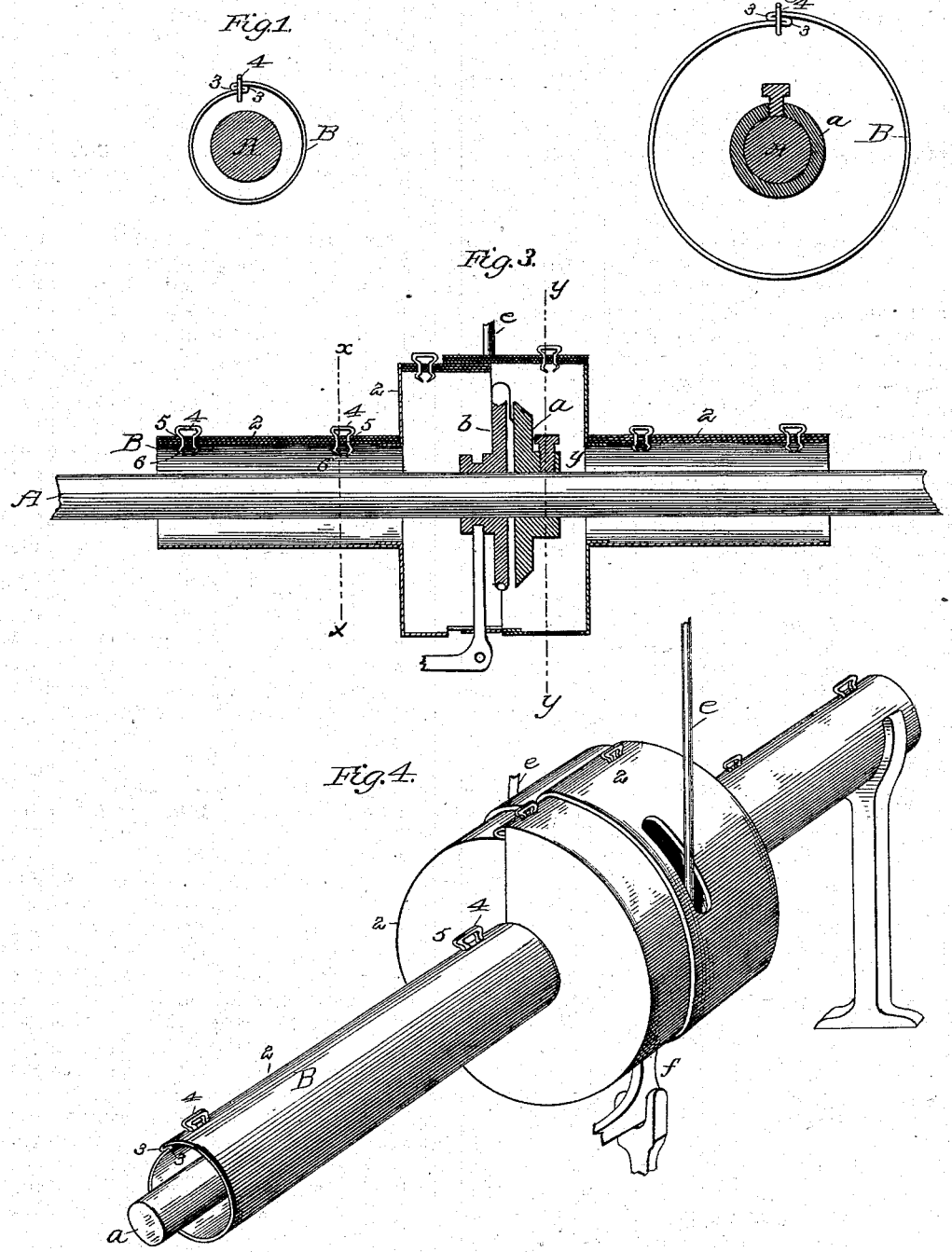

UNITED STATES PATENT OFFICE.

WILLIAM F. HUTCHINSON, OF LYNN, MASSACHUSETTS.

SHAFT-CASING.

SPECIFICATION forming part of Letters Patent No. 276,589, dated May 1, 1883.

Application filed August 25, 1882. (No model.)

*To all whom it may concern:*

Be it known that I, WILLIAM F. HUTCHINSON, of Lynn, in the county of Essex and Commonwealth of Massachusetts, have invented certain new and useful Improvements in Safety Attachments for Shafting, of which the following, taken in connection with the accompanying drawings, is a specification.

In work-shops and factories where machinery is used the shafting employed to drive the same is commonly arranged to turn in suitable hangers suspended from the ceiling or erected upon the floor of the apartment, and is left open and unguarded, so that persons employed about the same are constantly exposed to painful and serious accidents, that happen by the clothing of the operator becoming entangled with the running shaft and himself being revolved about the same. It is to obviate this difficulty and prevent the happening of such accidents that constitutes the object of this my invention.

My invention consists of certain improved details of construction, which are hereinafter fully described and claimed.

In the accompanying drawings my invention is represented in combination with a section of shafting having suitable attachments for the operation of sewing-machines, although the invention is equally applicable to other lines of shafting.

Figure 1 gives a transverse section of the shaft having my improved guard applied thereto, the cutting-plane being made to pass through line *x x* in Fig. 3. Fig. 2 is a similar view of the same, made on line *y y* in Fig. 3. Fig. 3 gives a longitudinal vertical section of the shaft and applied guard, and Fig. 4 is a perspective view of the same.

The shaft A is provided with a fixed clutch, *a*, and a loose friction-pulley, *b*, and may be arranged to turn in bearings in any ordinary and suitable manner. A belt, *e*, extends from the pulley *b* to the driving-wheel of a machine, (not shown,) to be mounted upon any suitable bench or table above the shaft.

The machine may be set in motion and operated by means of the treadle *f* in an obvious and well-known manner.

The guard B, which comprises my invention properly, may be composed of leather-board, pasteboard, sheet metal, or any similar material that permits of being molded to the required shape and form about the shaft. The size of the roll should approximate to, but slightly exceed, the size of the shaft for which it is intended as a guard. It is made in sections 2 2 2 2, any number of which may be united together by overlapping at the ends, as represented, and thus may be formed a continuous piece of sufficient length to cover any desired line of shafting. Those sections of the guard which are intended to cover pulleys or other projections on the shaft are preferably made with angles 7, which permit of rapidly enlarging the guard to accommodate the increased size of the pulley and of again rapidly diminishing the same to fit the next smaller section of the guard. The edges 3 3 of the guard are turned over, so as to interlock with each other, when the guard is sprung round the shaft, as represented in Figs. 1 and 2. A pin, 4, being passed through a hole in the interlocking edges of the guard, serves to prevent the same from getting disengaged. Said pin 4 is preferably composed of spring metal, and formed with suitable shoulders, 5 and 6, as shown. The pin should be sprung together while being put through the hole in the guard, and then should be allowed to expand to force the edges of the guard in between the shoulders 5 and 6 of the pin, and thereby to prevent the escape of the pin until it is again sprung together, as before. Suitable holes can be made in the guard wherever desired to accommodate belts or other devices connected with the shaft or the pulleys thereon. The guard may be supported in position by inside boxes arranged loosely on the shaft and suitably weighted to prevent turning therewith, or by means of hangers or standards attached to the ceiling or floor of the apartment containing the same, all in an obvious and well-known manner.

From the foregoing it will be understood that this my invention enables me to provide a complete and economical guard for shafting, which permits of being readily combined with the shaft while in position, and likewise permits of being quickly removed, either in part or in all, to facilitate in cases of repair either to itself or the shaft, and then being replaced, as before, this whenever occasion requires, without interfering with the shaft and without diminishing or destroying the utility of the guard.

I am aware that casings for shafting have heretofore been shown composed of hinged sections, such being the subject of Letters Patent No. 158,080, of December 22, 1874, and I do not broadly claim such construction; but What I do claim is—

A guard for shafting, consisting of the sections 2 2 2 2, each section formed of a single piece, and adapted to be sprung around the shaft and combined with suitable supports, substantially as described.

In testimony whereof I have signed my name to this specification in presence of two witnesses.

WM. F. HUTCHINSON.

Witnesses:
S. RUTH,
C. B. TUTTLE.